United States Patent [19]
Berger et al.

[11] Patent Number: 5,590,923
[45] Date of Patent: Jan. 7, 1997

[54] INTERCHANGEABLE JAW TONGS

[75] Inventors: Robert P. Berger, Encino; Steven Benson, Simi Valley, both of Calif.

[73] Assignee: Belle de St. Claire, Chatsworth, Calif.

[21] Appl. No.: 388,866

[22] Filed: Feb. 14, 1995

[51] Int. Cl.$^6$ .................................................. B25J 15/04
[52] U.S. Cl. ................................. 294/19.1; 294/116
[58] Field of Search ................. 294/11, 19.1, 22–24, 294/50.8, 50.9, 100, 104, 115, 116, 902

[56] References Cited

U.S. PATENT DOCUMENTS

| | | | |
|---|---|---|---|
| 1,239,201 | 9/1917 | MacLachlan | 294/50.8 |
| 1,350,123 | 8/1920 | Theodore | 294/19.1 |
| 1,457,198 | 5/1923 | Utley | 294/115 |
| 2,807,495 | 9/1957 | Pillstrom | 294/19.1 X |
| 2,923,054 | 2/1960 | Hoffman et al. | 294/19.1 X |
| 3,527,492 | 9/1970 | Hollis | 294/19.1 |
| 4,483,562 | 11/1984 | Schoolman | 294/19.1 |
| 4,669,769 | 6/1987 | Polder | 294/19.1 |
| 4,962,957 | 10/1990 | Traber | 294/19.1 |

OTHER PUBLICATIONS

Kerr Sybron Catalog 1984 Cover, pp. 1, 5, and 6.
Neycraft Catalog, Cover, pp. 1 & 5 (no date).

*Primary Examiner*—Johnny D. Cherry
*Attorney, Agent, or Firm*—Wood, Herron & Evans

[57] ABSTRACT

An apparatus for gripping hot investment molds either of the ring type or of the oval type, has a plastic handle with an elongated square tube extending therefrom. A trigger in the handle is connected to a linkage rod which pulls back on a closer frame. Rearwardly extending crossed tails of a pair of jaws are squeezed together by rearward movement of the closer, for closing outwardly extending palms of the jaws around an investment mold. The jaw assembly is removable so that jaws having shapes adapted specifically to engage either an investment ring or an investment oval can be provided.

20 Claims, 5 Drawing Sheets

5,590,923

INTERCHANGEABLE JAW TONGS

FIELD AND BACKGROUND OF THE INVENTION

The present invention relates, in general, to tongs for handling hot objects, and in particular, to a new and useful apparatus which has easily interchangeable jaws which are constructed specifically for grasping hot investment molds or flasks which are either of the oval type or cylindrical ring type.

The use of investment casting technology in the field of dentistry and jewelry, is well-known and well-developed. A pattern made of wax or meltable synthetic material is prepared. This pattern substantially corresponds to the piece of jewelry or dental hardware to be cast in metal. The pattern is set on a base using sprues and then a flask, traditionally a cylinder of metal having opposite open ends, is set around the pattern and onto the base. An investment solution is then carefully poured into the flask with appropriate safeguards to avoid the formation of bubbles around the pattern. The investment is allowed to set. The base is then removed and the investment is heated to melt away the pattern and leave a void on the inside of the investment. This void is the shape of the jewelry piece or dental hardware.

Using appropriate metal casting equipment, the void is then filled with metal, for example, gold or other precious or nonprecious metal.

Once the metal has cooled and set, the investment is broken away revealing the metal part which can then be further processed.

Furnace temperatures are in the neighborhood of 900° F. to 2100° F. and the investment is also at this temperature during much of the process. Tongs for use in holding the conventional cylindrical investments are known and are made of metal. See, for example, the catalogs to Kerr Sybron and Neycraft which carry one piece metal tongs. These tongs are very short and generally require the operator to be within 12 inches of the hot casting mold. Heavy gloves must be used or else the operator would quickly burn his or her hand. Even with heavy gloves, eventually the gloves become too hot because of the heat radiating from the furnace and mold, and must be removed and allowed to cool. Although longer tongs might be utilized, these can only be operated using both hands and the operator would have difficulty holding and manipulating the hot investment mold using such tongs. Often, a second operator is required in order to load the molds into the casting machines while the operator controls a torch forming part of the casting machine. Tongs are known which have a handle with trigger, a long shaft and jaws that can be closed by pressing the trigger. These are generally used in a grocery store environment. U.S. Pat. No. 3,527,492 discloses an instrument which goes by the commercial name "EZ Reacher". The instrument is used to pick up trash and has a trigger. While rubber or metal tips can be provided on the jaws of this instrument, the instrument is too flexible and cannot be used to grasp and hold items as heavy as casting molds. The tongs are designed for maximum load of about 4 to 12 ounces and are not strong enough or specially designed to be heat resistant.

Since many of the furnaces, casting machines and other equipment used during the casting of jewelry and dental parts, utilize electricity, it would also be advantageous to utilize tongs which are not electrically conducting. This is not the case for the tongs normally used in the field of jewelry and dental casting which, as noted above, are made of a single piece of metal which is inherently electrically conductive.

The traditional cylindrical investment molds have also been partly replaced by oval molds introduced by the co-inventor of the present application and others. There is no currently available mechanism for conveniently and accurately grasping oval casting molds.

SUMMARY OF THE INVENTION

An object of the invention is to provide an instrument which has a removable jaw assembly so that jaws specifically shaped to grasp either the investment ring or the investment oval, can be utilized.

Another object of the invention is to construct the apparatus so that the different jaw assemblies can be interchanged in a convenient manner without requiring tools.

Another object of the present invention is to provide interchangeable jaw tongs which include a plastic handle to establish electrical isolation between the operator and the jaws, yet are designed to be efficiently strong and robust for lifting and manipulating the hot and heavy investment molds.

Accordingly, a further object of the present invention is to provide an apparatus for grasping an investment mold having an outer shape, comprising: a handle; a channel having a noncircular elongated interior, one end of the channel being connected to the handle and the channel having an opposite open end; a jaw assembly removably engaged to the opposite end of the channel, the jaw assembly including a pair of jaws having facing palm portions shaped for engaging the outer shape of the investment mold; a jaw closer connected to at least one of the jaws for effecting movement of the palms toward each other; a trigger movably mounted to the handle; and a linkage connected between the trigger and the closer for moving the closer to move the palms toward each other.

Another object of the invention is to provide such an apparatus wherein the engagement between the jaws and closer is selected so that the jaw assembly can be removed from the channel without tools, the apparatus including a further jaw assembly having a pair of jaws each with palms shaped for engaging an investment mold with a different outer shape, the further jaw assembly being removably engaged to the channel and the jaws of the further jaw assembly being removably connected to the closer for moving the jaws of the further jaw assembly toward each other.

A further object of the invention is to make the handle and trigger plastic to establish an electrical insulation between the handle and the jaws.

A still further object of the invention is to provide an interchangeable jaw tongs which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
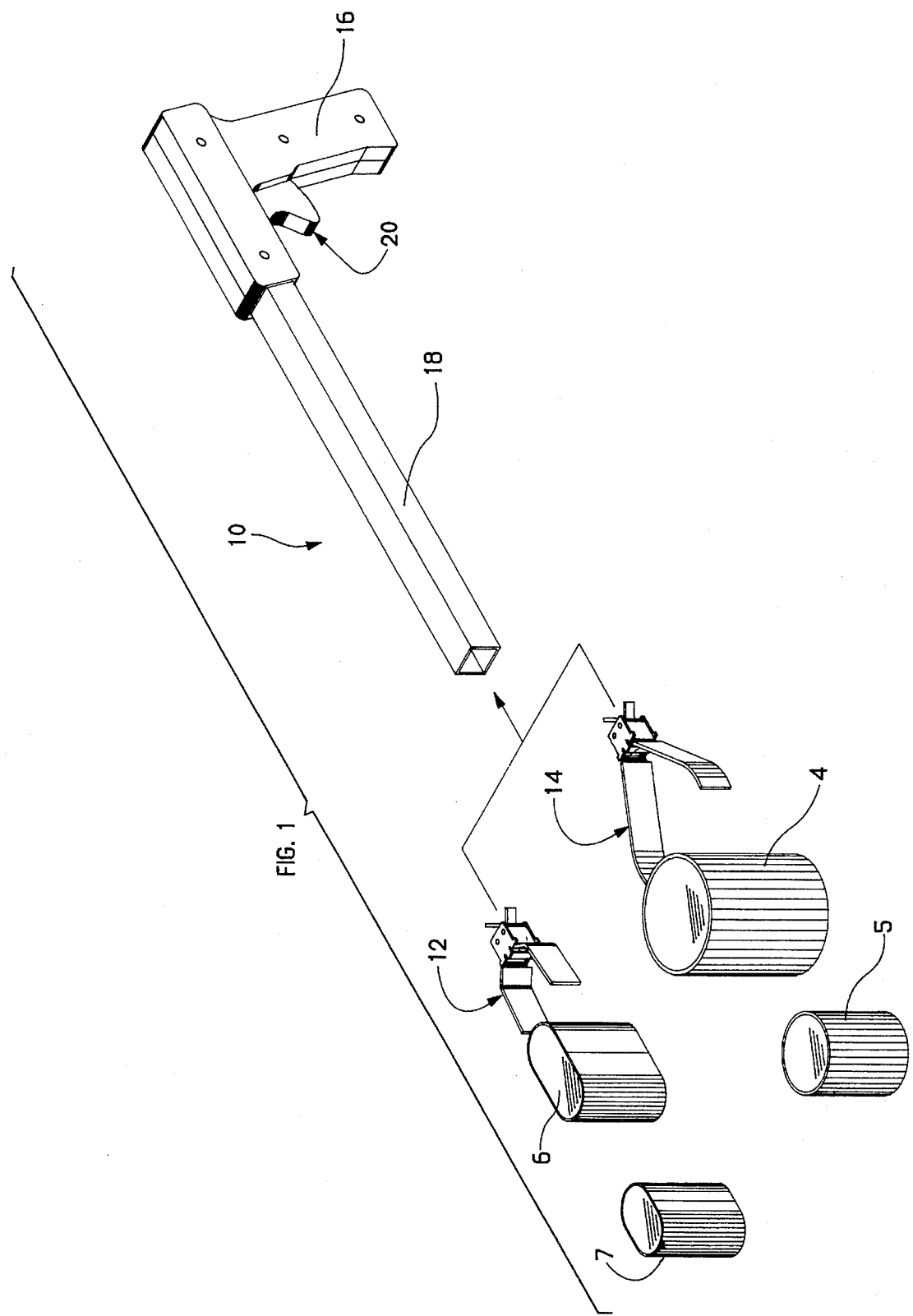
FIG. 1 is an exploded view of an interchangeable jaw tongs of the present invention with two jaw assemblies specially adapted to grasp and hold investment molds of different outer shapes.

Referring to the drawings in particular, the invention embodied in FIG. 1 comprises a tong assembly generally designated 10 having a plastic handle 16, made for example of ABS, or other strong plastic. A channel or tube 18, advantageously made of stainless steel, light weight aluminum or other metal, has a noncircular elongated interior which in the preferred embodiment is square. One end of the tube is connected to handle 16 while the opposite end is open and adapted to interchangeably receive one jaw assembly. A jaw assembly generally designated 12 has jaws with flat palm ends specially adapted to engage the flat sides of an oval investment mold, either of a large size 6 or a small size 7.

Tube 18 may alternately receive a second jaw assembly 14 having jaws with bent palm ends, especially designed to engage the outer shape of conventional investment rings of the large size 4 or the small size 5.

Figure 2:
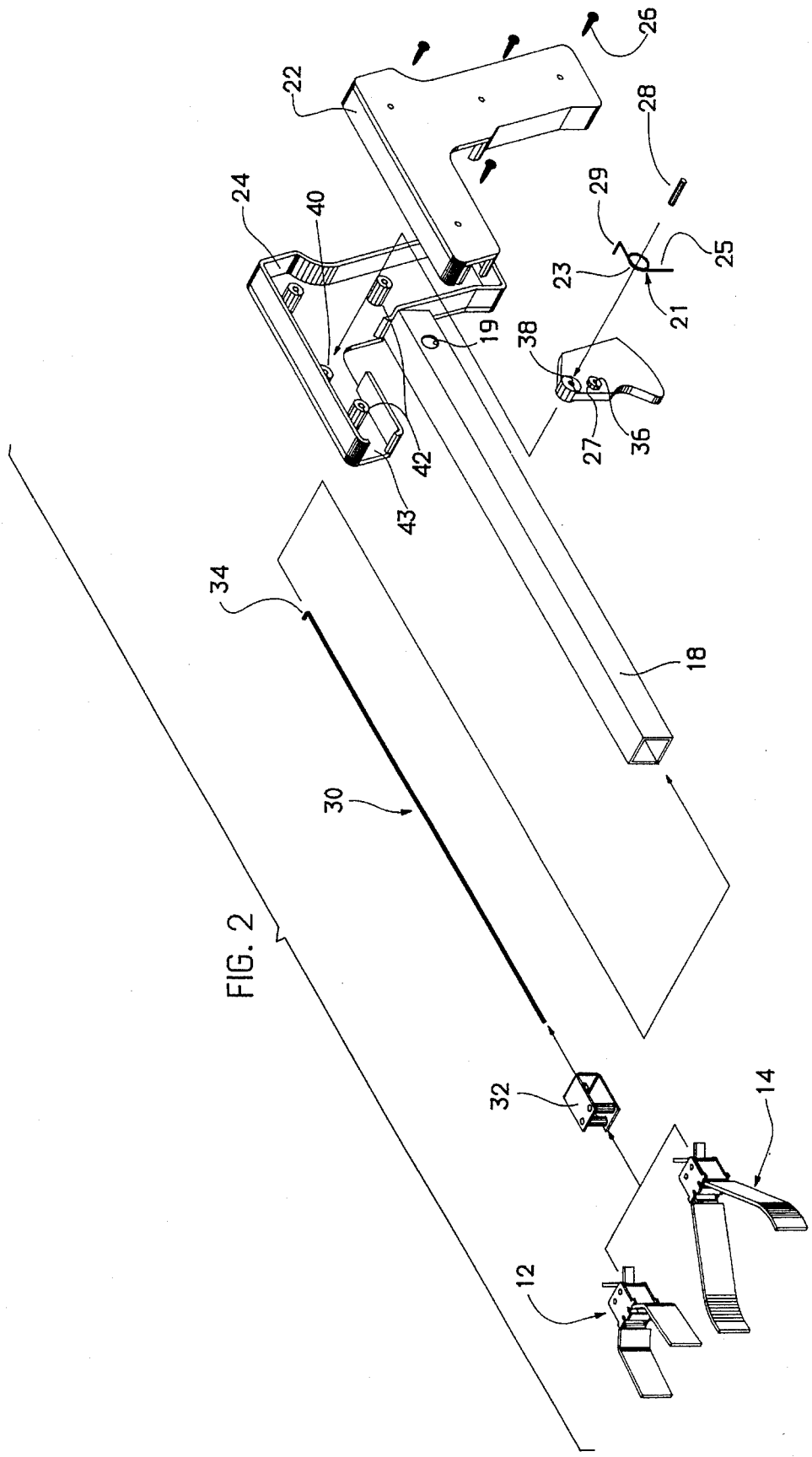
FIG. 2 is an exploded view of the apparatus of the invention revealing its basic components.

FIG. 2 illustrates the construction of the handle which is advantageously made of first and second injection molded plastic parts 22 and 24 having side walls defining a hollow interior. A trigger 20 has a portion which extends through an opening defined between the handle sides and is pivotally mounted by a pin 28 extending through a pivot pinhole 38 and journaled in a pair of pin journals 40 molded into the handle sides. A trigger return spring generally designated 21 is also utilized to return trigger 20 to its extended position. Spring 21 includes a coil portion 23 which is engaged around one of the journals 40. A tangential portion 25 extends from coil portion 23 and engages against the outer circumference of a raised hub 27, molded on one surface of trigger 20, concentrically around hole 36 in the trigger whose purpose will be described later. At the other side of coil portion 23, an axial portion 29 is shaped to engage against an inner surface of the periphery of the handle. With coil portion 23 providing biasing force, and ends 25 and 29 being respectively engaged against the trigger and housing, spring 21 returns trigger 20 to its extend position, after the trigger has been pulled.

Screws, for example, self-tapping metal screws 26, extend through holes in handle side 22 and are screwed into screw posts 42 molded into the other handle side 24. This holds the handle sides together, traps the movable trigger 20 between the handle sides, and also fixes one end of the tube 18 to the handle. To help positively fix tube 18 within the handle, a through-hole 19 is formed at the inner end of tube 18, which closely receives one of the screw posts 42 and, cooperating with the shape of the opening 43 at the front end of the handle housing, rigidly fixes tube 18 to the handle.

Both the inner and outer ends of tube 18 are open and the tube receives a linkage rod 30 having a bent end 34 which is engaged into the trigger linkage recess or hole 36 in the side of trigger 20 at a location spaced from the pivot pin 28. By squeezing trigger 20, rod 30 is pulled to the right in FIG. 2.

Figure 4:
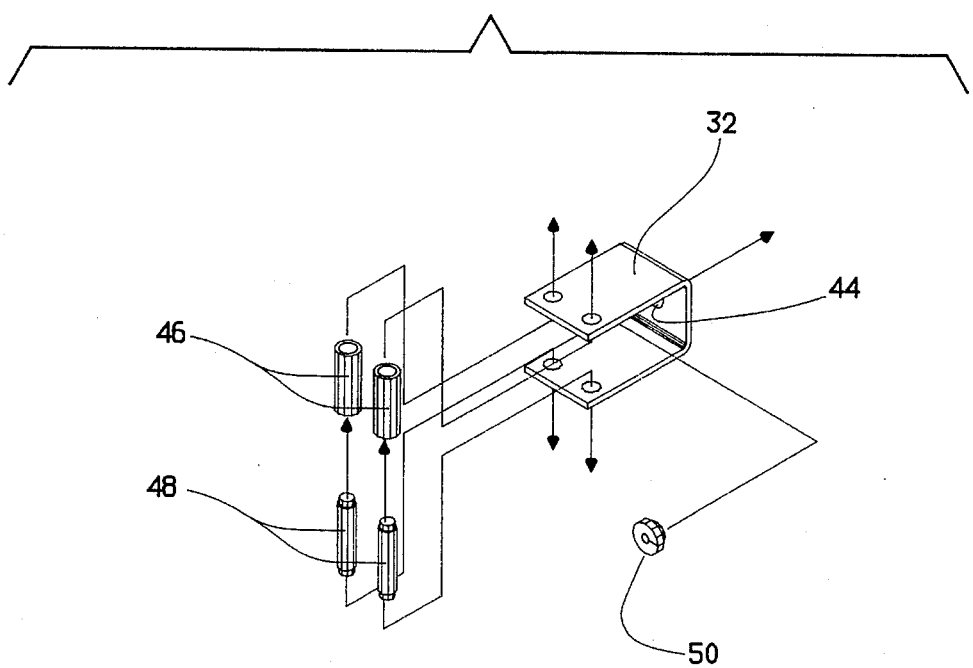
FIG. 4 is an exploded view of a closer of the apparatus of the invention.

The end of rod 30 opposite from bent end 34, extends through a hole in the rear end of a U-shaped jaw closer 32 made of stainless steel or other metal. A fastener, such as a clinching fastener shown at 50 in FIG. 4, is engaged to the end of rod 30, holding the rod to the closer 32.

Figure 3:
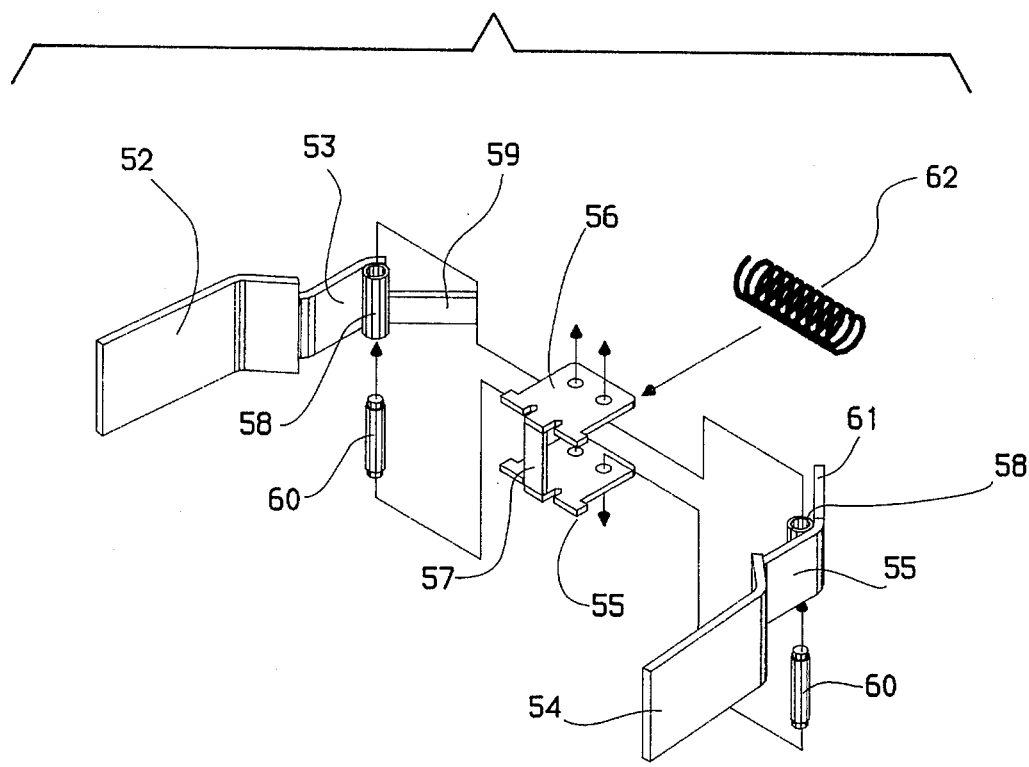
FIG. 3 is an exploded view of the jaw assembly of FIG. 1.

Referring now to FIG. 3, each jaw assembly comprises a generally U-shaped metal jaw frame 56 made of stainless steel or other metal and including upper and lower plates separated by a narrow web 57, made as one piece with the plates.

Each of the plates includes a pair of holes spaced rearwardly of the web 57. A pair of roller pins 60 are engaged to the pairs of holes in the upper and lower plates of frame 56. Each pin 60 rotatably receives a tube or jaw roller 58 which is welded and thus fixed to an inner bent surface of the respective jaws 52 and 54.

A spring 62 is captured between flat wrist portions 53 and 55 of the jaws 52, 54, between the web 57 and the roller 58. This biases the palms or flat broad engaging portions of the jaws, away from each other. Each of the jaws also includes a half tail 59 and 61 which extends at an angle to the wrist portions 53 and 55 respectively. The tails cross each other to form an X or V, extending rearwardly of the frame (see FIG. 2).

FIG. 4 is an exploded view of the closer 32 which has a one-piece U-shaped frame with upper and lower plates each with a pair of holes for receiving a pair of roller pins 48. A closer roller 46 is rotatably mounted on each roller pin 48 and is captured between the upper and lower plates of U-shaped closer 32. The back wall of the closer includes hole 44 which receives the straight end of linkage rod 30 which is captured by the fastener 50.

The apex of the V formed by the crossed half tails 59, 61 of the jaw assembly, is captured between closer rollers 48. When trigger 20 is depressed, this pulls rod 30 rearwardly which in turn pulls closer 32 rearwardly. This draws rollers 48 to the rear, squeezing the half tails 59, 61 toward each other. In scissors fashion, this moves the palm portions of the jaws 52, 54 toward each other to grasp an investment casting. The jaws 52, 54 pivot about roller pins 60 which act as fulcrums for the jaws. Notches 51 on opposite sides of the top and bottom of web 57, are artifacts of the cutting and forming process that makes the frame.

Spring 62 resists this movement and, when the trigger is released, spring 62 separates the palm portions of the jaws and at the same time, pulls closer 32 forwardly in the tube 18.

The generally square outer configuration of closer 32 closely fits within the hollow square tube 18. This prevents rotation of the closer with respect to the tube. A generally square outer configuration of the upper and lower frame plates 56 is also shaped to plug into the square end of tube 18. Ears 55 near the front end of each plate 56 act as stops to fix the depth by which the frame can be plugged into the end of the tube 18.

Figure 5:
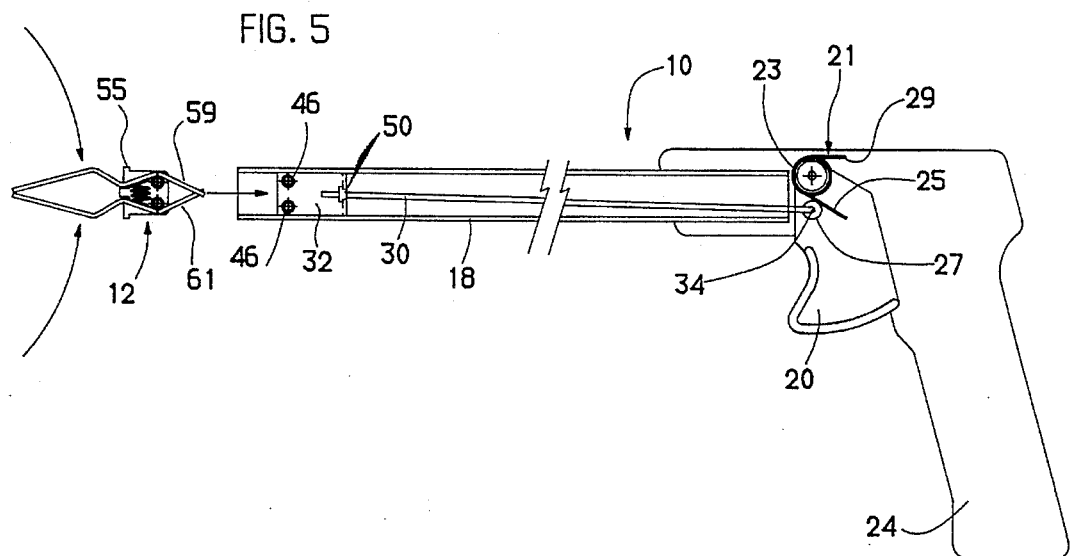
FIGS. 5, 6 and 7 show respective schematic side views of the inventive apparatus, illustrating how the jaw assembly can be interchanged without tools.
Figure 6:
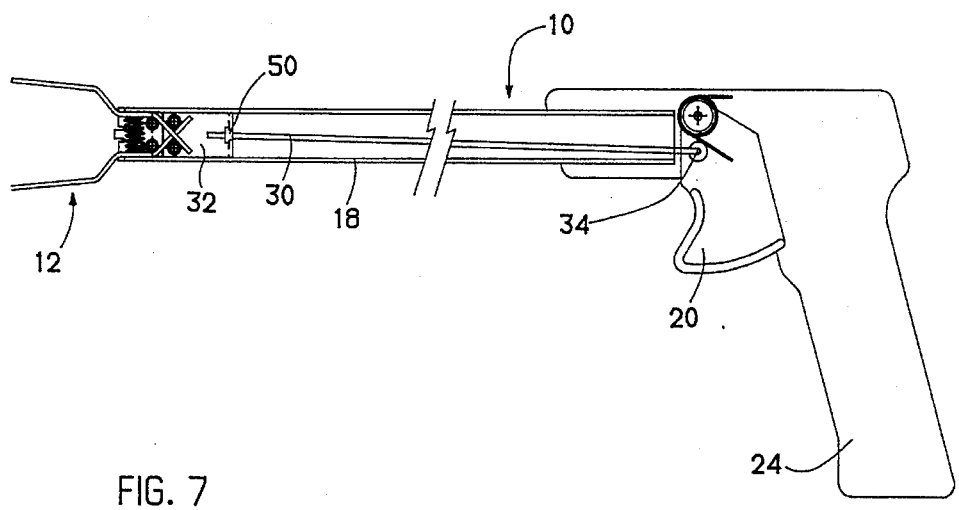

FIG. 5 illustrates the first step in inserting the jaw assembly 12 into the open end of tube 18. The palm portions of the jaws are squeezed together in the direction of the double curved arrows. This brings the ends of the half tails 59, 61, close to each other so that they can be inserted into the space between the rollers 46, 46, mounted in the closer frame 32. FIG. 6 illustrates the seated and open position for jaw assembly 12 with the V or X configuration between the half tails 59, 61, illustrated when trigger 20 is not depressed.

Figure 7:
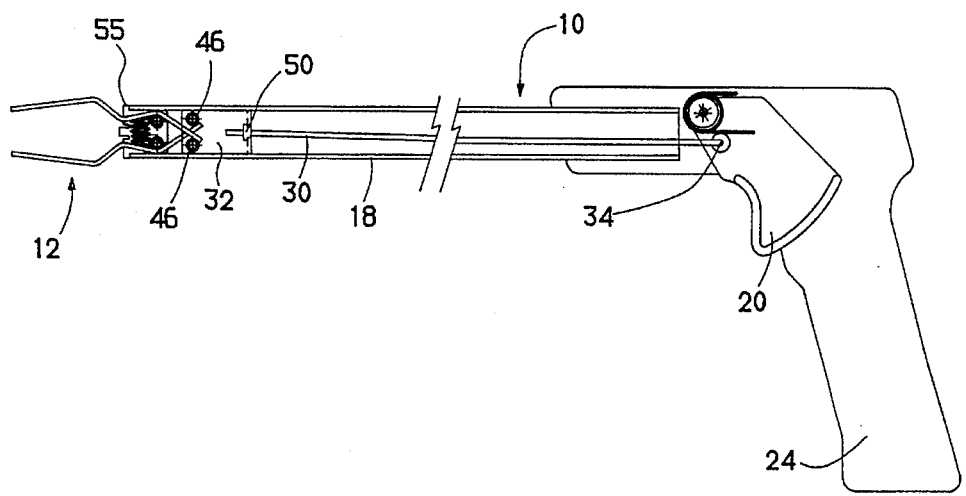

FIG. 7 illustrates the closed position for the jaws when trigger 20 is depressed, pulling rod 30 to the right which in turn causes the fixed spacing between rollers 46, to squeeze the half tails of the jaws together, closing the palm of the jaws toward each other against the bias of the spring.

Figure 8:
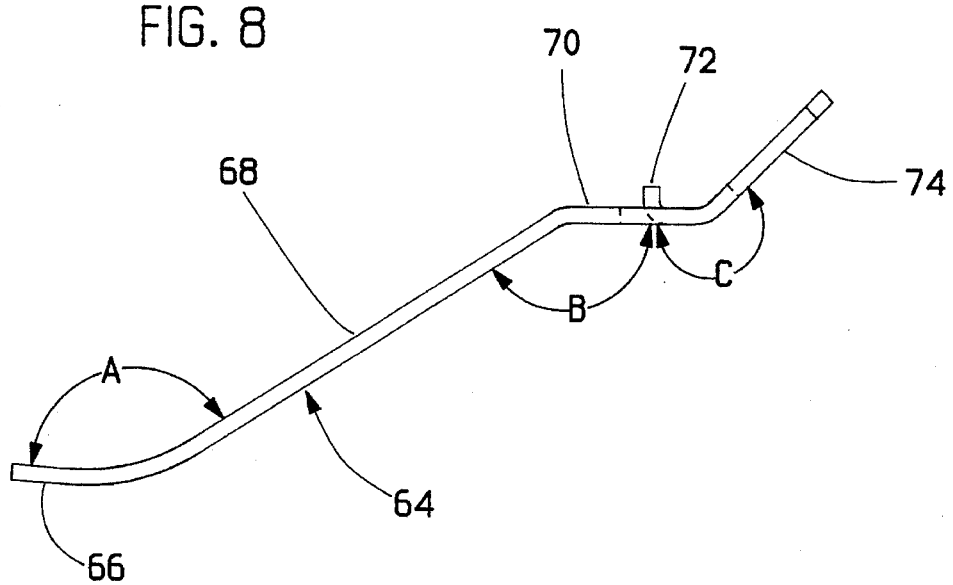
FIGS. 8 and 9 are respective top and side views of a jaw of the tongs of the present invention.
Figure 9:
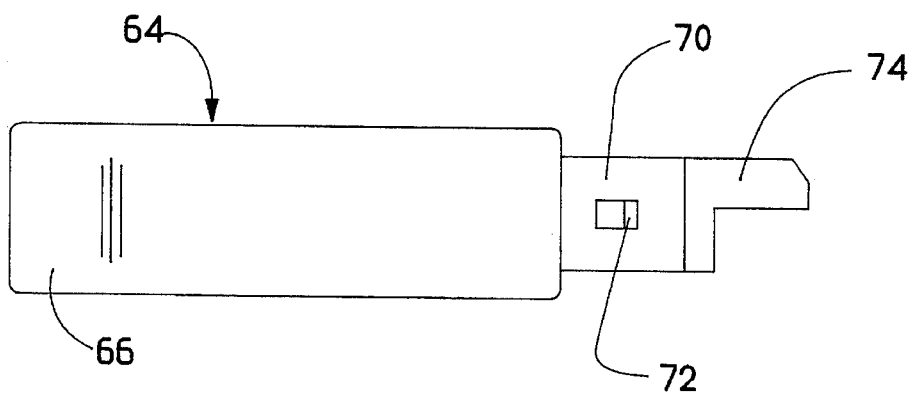

FIGS. 8 and 9 show details of jaw 64 shaped for engaging a cylindrical or ring investment casting. The otherwise flat palm portions 68 have a curved end 66, bent at an angle A, for at least partly embracing the cylindrical outer shape of the ring casting. A second angle B forms a bend between the palm portion 68 and a flat wrist portion 70 which is also narrower in height. In this way, the wrist 70 can be trapped between the upper and lower plates of the jaw frames 56. As noted above, pivotal action between the jaws is achieved by pivoting of the jaw rollers 58 which are fixed to the jaws, and rotatable on the pins 60.

Returning to FIGS. 8 and 9, the flat wrists 70 may also include a curved projection 72, made by punching a hole into the metal wrist and forming the projection. Projection 72 is positioned to embrace the ends of spring 62 in the respective jaw assembly, to further hold the spring and keep it away from the web 57 for facilitative opening of the jaws. Half tails 74 are also illustrated which are bent at an angle C with respect to the wrist 70.

While in the preferred embodiment, both jaws are articulated, the invention includes the possibility of moving only one of the jaws, keeping the other jaw fixed. In that case as well, the palms will move toward each other and further, the shapes of jaws draws are selected to compliment and engage the outer shape of the investment molds.

Although a square tube 18 is shown, an opened or closed elongated channel may be substituted, as long as the elongated interior is noncircular to avoid rotation of the closer 32.

A comparison between FIGS. 1 and 5 will also reveal the fact that the jaw assemblies may either close vertically or horizontally. Both the jaw assembly 12 and the closer 32 must be in the same orientation but they both may be rotated by 90° before they are engaged in the tube 18.

The jaws are shown shaped for cylindrical or oval molds. The jaws can be shaped to accommodate any other shape as well and in fact, can be used to grasp any item, particularly heavy, hot and/or electrically active or potentially electrically active objects.

While a specific embodiment of the invention has been shown and described in detail to illustrate the application of the principles of the invention, it will be understood that the invention may be embodied otherwise without departing from such principles.

What is claimed is:

1. An apparatus for grasping an investment mold having an outer shape, comprising:

a handle;

a channel having a noncircular elongated interior, one end of the channel being connected to the handle and the channel having an opposite open end;

a jaw assembly removably engaged to the opposite end of the channel, the jaw assembly including a pair of jaws having facing palms shaped for engaging the outer shape of the investment mold, and a jaw frame having upper and lower portions each jaw having a wrist movably mounted between the upper and lower portions, the palm of each jaw extending out of the jaw frame, a tail extending from each wrist with the tails of the pair of jaws crossing each other;

a jaw closer connected to at least one of the jaws for effecting movement of the palms toward each other, the closer having a first pair of spaced apart members between which the crossed tails are inserted;

a trigger movably mounted to the handle; and a linkage connected between the trigger and the closer for moving the closer to move the palms toward each other.

2. An apparatus according to claim 1, the linkage being connected between the closer and trigger so that the closer is pulled when the trigger is moved to draw the members across the crossed tails which move the crossed tails toward each other, the jaws being pivotally connected to the jaw frame so that movement of the crossed tails toward each other causes movement of the palms toward each other.

3. An apparatus according to claim 2, including biasing means between the jaws for biasing the palms of the jaws away from each other.

4. An apparatus according to claim 3, wherein the first pair of members comprise closer rollers for rolling across the crossed tails.

5. An apparatus according to claim 4, including a second pair of spaced apart members in the jaw frame, each of the jaws being pivotally engaged against one of the second pair of members.

6. An apparatus according to claim 5, wherein the second pair of members each comprise a jaw roller.

7. An apparatus according to claim 6, wherein the closer comprises a U-shaped member having upper and lower plates between which the closer rollers are rotatably mounted, and a rear plate having an opening therethrough, through which the linkage extends for connecting the linkage to the closer.

8. An apparatus according to claim 7, wherein the jaw frame has upper and lower plates connected to each other by a web which extends between the jaws, the biasing means comprising a spring in the jaw frame between the web and the closer rollers.

9. An apparatus according to claim 4, including trigger return means for biasing the trigger into a closer release position in which the closer is not pulled by the trigger.

10. An apparatus according to claim 9, wherein the tails of the jaws cross one another to form a V shape.

11. An apparatus according to claim 10, wherein the palm of each jaw is flat.

12. An apparatus according to claim 10, wherein the palm of each jaw has a bend.

13. An apparatus according to claim 1, wherein the handle is nonconducting synthetic material, the jaw assembly, channel, closer and linkage being made of metal.

14. An apparatus according to claim 13, wherein the handle comprises a pair of molded handle sides which are connected to each other, the trigger being movably mounted between the handle sides and being made of synthetic nonconducting material.

15. An apparatus according to claim 14, wherein the linkage comprises a rod having a bent end engaged with the trigger and an opposite straight end extending through a portion of and connected to the closer.

16. An apparatus according to claim 15, wherein the closer comprises a U-shaped piece of metal having a rear plate having a holder therethrough for receiving the rod, upper and lower plates spaced from each other and engaged into the noncircular elongated interior of the channel, and a pair of spaced apart members for receiving portions of the jaws therebetween for moving the palms of the jaws toward each other when the closer is moved with respect to the jaw assembly.

17. An apparatus according to claim 16, wherein the channel comprises a tube having a rectangular cross-section and opposite open ends.

18. An apparatus according to claim 1, including first biasing means for moving the jaws to an open position and second biasing means for moving the trigger to an outward position with respect to the handle.

19. An apparatus according to claim 18, wherein the first biasing means comprises a spring between the jaws and the second biasing means comprises a coil spring engaged to the trigger and between the trigger and the handle.

20. An apparatus according to claim 1, wherein said jaws are structured such that the jaw assembly is removable from between the second pair of members when the jaw palms are forced together.

* * * * *